(12) United States Patent
Mandre

(10) Patent No.: US 8,345,581 B2
(45) Date of Patent: Jan. 1, 2013

(54) COMMUNICATION SYSTEM

(75) Inventor: Indrek Mandre, Tallinn (EE)

(73) Assignee: Skype, Dublin (IE)

( * ) Notice: Subject to any disclaimer, the term of this patent is extended or adjusted under 35 U.S.C. 154(b) by 781 days.

(21) Appl. No.: 12/220,437

(22) Filed: Jul. 24, 2008

(65) Prior Publication Data

US 2009/0316686 A1   Dec. 24, 2009

(30) Foreign Application Priority Data

Jun. 18, 2008   (GB) .................................. 0811198.1

(51) Int. Cl.
*H04L 12/16* (2006.01)

(52) U.S. Cl. .................... 370/261; 370/260; 379/202.01; 379/204.01; 379/205.01

(58) Field of Classification Search .......................... None
See application file for complete search history.

(56) References Cited

U.S. PATENT DOCUMENTS

| | | | |
|---|---|---|---|
| 5,491,743 A | 2/1996 | Shiio et al. | |
| 5,745,711 A | 4/1998 | Kitahara et al. | |
| 6,148,068 A | 11/2000 | Lowery et al. | |
| 6,385,461 B1 * | 5/2002 | Raith | 455/518 |
| 6,731,625 B1 | 5/2004 | Eastep et al. | |
| 7,343,008 B1 | 3/2008 | Frankel | |
| 2002/0118809 A1 * | 8/2002 | Eisenberg | 379/202.01 |
| 2002/0143877 A1 | 10/2002 | Hackbarth et al. | |
| 2003/0119540 A1 | 6/2003 | Mathis | |
| 2003/0153339 A1 * | 8/2003 | Crockett et al. | 455/518 |
| 2003/0164853 A1 * | 9/2003 | Zhu et al. | 345/753 |
| 2003/0227939 A1 | 12/2003 | Yukie et al. | |
| 2003/0233650 A1 | 12/2003 | Zaner et al. | |
| 2004/0170265 A1 | 9/2004 | Benco et al. | |
| 2005/0149876 A1 | 7/2005 | Kortum et al. | |
| 2006/0010200 A1 | 1/2006 | Mousseau et al. | |
| 2006/0031341 A1 | 2/2006 | White et al. | |
| 2006/0147009 A1 * | 7/2006 | Greenlee et al. | 379/202.01 |

(Continued)

FOREIGN PATENT DOCUMENTS

EP    1209849 A2 *   5/2002

(Continued)

OTHER PUBLICATIONS

International Search Report and Written Opinion, PCT/EP2009/057490, date of mailing Aug. 19, 2009.

(Continued)

*Primary Examiner* — Jason Mattis
*Assistant Examiner* — James P Duffy
(74) *Attorney, Agent, or Firm* — Wolfe-SBMC

(57) ABSTRACT

A method is provided of authorizing a user of a communication system to be added to a group communication event. The method comprises: selecting a group of users of the communication system; initiating from a host node the group communication event with the group of users; responsive to receiving a group communication acceptance from at least a first user in the group, establishing the group communication event with the first user in the group; receiving at the host node a communication set up request from another user of the communication system; analyzing the communication set up request to determine if said communication set up request is associated with said group communication event initiated by the host node; and adding said other user to the group communication event if it is determined that the communication set up request is associated with said group communication event.

20 Claims, 8 Drawing Sheets

U.S. PATENT DOCUMENTS

| | | | |
|---|---|---|---|
| 2006/0210044 A1 | 9/2006 | Widger | |
| 2007/0073880 A1* | 3/2007 | Krishnakumar et al. | 709/225 |
| 2007/0106795 A1 | 5/2007 | Gilfix et al. | |
| 2008/0009303 A1 | 1/2008 | Westman et al. | |
| 2009/0316685 A1 | 12/2009 | Mandre | |

FOREIGN PATENT DOCUMENTS

| | | | |
|---|---|---|---|
| EP | 1 395 019 A2 | | 3/2004 |
| EP | 1 471 711 A3 | | 7/2005 |
| EP | 2040494 A1 | * | 3/2009 |
| GB | 2460896 | | 12/2009 |
| GB | 2460897 | | 12/2009 |
| JP | 8256145 | | 3/1995 |
| JP | 10-198620 | | 1/1997 |
| JP | 2005-311527 | | 4/2004 |
| WO | WO 00/30375 A2 | | 5/2000 |
| WO | WO 2004/073288 A2 | | 8/2004 |
| WO | WO 2005/009019 A2 | | 1/2005 |
| WO | WO 2005/041086 A1 | | 5/2005 |
| WO | WO 2006/118729 A2 | | 11/2006 |
| WO | WO 2008/070471 A2 | | 6/2008 |
| WO | WO 2009/092242 A1 | | 7/2009 |
| WO | WO-2009153267 | | 12/2009 |
| WO | WO-2009153269 | | 12/2009 |

OTHER PUBLICATIONS

Johnston MCI O Levin Microsoft Corporation, "Session Initiation Protocol Call Control—Conferencing for User Agents, draft-ietf-sipping-cc-conferencing-07," *IETF Standard-Working-Draft, Internet Engineering Task Force, IETF, CH*, vol. sipping, No. 7 (Jun. 3, 2005).

Taha, H. H., "Architecture of a SIP-Based Conferencing Server," *Diploma Thesis* [online], May 27, 2005 [retrieved on Aug. 5, 2009]. Retrieved from the Internet URL: http://www.voxgratia.org/docs/opal/Thesis_Taha.pdf.

Rosenberg, J., "A Framework for Conferencing with the Session Initiation Protocol (SIP)," *Networking Working Group Request for Comments*, 4353: 1-29 (Feb. 1, 2006).

Mahy Airespace D Petrie Pingtel R, "The Session Initiation Protocol (SIP) Join Header," *IETF Standard, Internet Engineering Task Force, IETF, CH*, (Oct. 1, 2004).

Search Report under Section 17, GB0811198.1, date of search Sep. 15, 2009, 2 pages.

International Search Report and Written Opinion, PCT/EP2009/057485, date of mailing Aug. 14, 2009.

International Search Report, GB/0811195.7, date of mailing Sep. 14, 2009.

"Advisory Action", U.S. Appl. No. 12/220,435, (Jan. 10, 2012), 6 pages.

"Final Office Action", U.S. Appl. No. 12/220,435, (Oct. 31, 2011), 18 pages.

"Non-Final Office Action", U.S. Appl. No. 12/220,435, (May 24, 2011), 14 pages.

"Non-Final Office Action", U.S. Appl. No. 12/220,435, (May 22, 2012), 14 pages.

"Final Office Action", U.S. Appl. No. 12/220,435, (Nov. 9, 2012), 14 pages.

* cited by examiner

COMMUNICATION SYSTEM

RELATED APPLICATION

This application claims priority under 35 U.S.C. §119 or 365 to Great Britain, Application No. 0811198.1, filed Jun. 18, 2008. The entire teachings of the above application are incorporated herein by reference.

TECHNICAL FIELD

The present invention relates to a communication system. In particular the present invention relates to a method and apparatus for adding participants to a conference call.

BACKGROUND

Packet-based communication systems allow the user of a device, such as a personal computer, to communicate across a computer network such as the Internet. Packet-based communication systems include voice over internet protocol ("VoIP") communication systems. These systems are beneficial to the user as they are often of significantly lower cost than fixed line or mobile networks. This may particularly be the case for long-distance communication. To use a VoIP system, the user must install and execute client software on their device. The client software provides the VoIP connections as well as other functions such as registration and authentication. In addition to voice communication, the client may also provide further features such as video calling, instant messaging, voicemail and file transfer.

One type of packet-based communication system uses a peer to peer topology built on proprietary protocols. To enable access to a peer to peer system, the user must execute peer to peer client software provided by a peer to peer software provider on their computer, and register with the peer to peer system. When the user registers with the peer to peer system the client software is provided with a digital certificate from a server. Once the client software has been provided with the certificate, communication can subsequently be set up and routed between users of the peer to peer system without the further use of a server. In particular, the users can establish their own communication routes through the peer to peer system based on the exchange of one or more digital certificates (or user identity certificates, "UIC"), which enable access to the peer to peer system. The exchange of the digital certificates between users provides proof of the users' identities and that they are suitably authorised and authenticated in the peer to peer system. Therefore, the presentation of digital certificates provides trust in the identity of the user. It is therefore a characteristic of peer-to-peer communication that the communication is not routed using a server but directly from end-user to end-user. Further details on such a peer to peer system are disclosed in WO 2005/009019.

It is known to connect more than two terminals via a communication system in a group call. In a group call, otherwise known as a conference call, a group of participating terminals may be connected together via a host terminal. The host is arranged to collect incoming signals from each participant terminal and combine the signals before sending the combined signals to the participating terminals.

Reference is made to FIG. 1 which shows a group of terminals 104, 114 and 124. The terminals are connected to the internet (not shown). Each terminal is operated by a user. In this case User A operates terminal 104, user B operates terminal 114 and User C operates terminal 124.

As shown in FIG. 1, User B may attempt to initiate a call with User A by transmitting a call set up request, CR, to User A when User A is engaged on a call with User C. User A is notified of the incoming call from User B and is provided with an option of authorising User B to be added to a group call with User A and User C.

One problem with this method is that the User A does not know whether User B wishes to be added to the group call.

Another problem with this method is that User A does not know if User C will object to the other user being added to the call.

SUMMARY

It is therefore an aim of the present invention to solve the above identified problems of the prior art. It is a further aim of the present invention to provide a method of efficiently handing authorisation of participants in a conference call without the need for complex authorisation procedures.

According to a first aspect of the present invention there is provided a method of authorising a user of a communication system to be added to a group communication event comprising; selecting a group of users of the communication system; initiating from a host node the group communication event with the group of users; responsive to receiving a group communication acceptance from at least a first user in the group, establishing the group communication event with the first user in the group; receiving at the host node a communication set up request from another user of the communication system; analysing the communication set up request to determine if said communication set up request is associated with said group communication event initiated by the host node; and adding said other user to the group communication event if it is determined that the communication set up request is associated with said group communication event.

According to a second aspect of the present invention there is provided a communication system comprising: a plurality of user terminals operated by a plurality of users of the communication system; and a host node, wherein the host node comprises: means for selecting a group of users from the plurality of users of the communication system; means for initiating a group communication event with the group of users; means for establishing a group communication event with at least a first user in the group, responsive to receiving a group communication acceptance from the at least first user in the group; means for receiving a communication set up request from one of said plurality of users of the communication system; means for analysing the communication set up request to determine if said communication set up request is associated with said group communication event initiated by the host node; and means for adding said other user to the group communication event if it is determined that the communication set up request is associated with said group communication event.

BRIEF DESCRIPTION OF THE DRAWINGS

For a better understanding of the present invention and to show how the same may be put into effect, reference will now be made, by way of example to the following drawings in which.

DETAILED DESCRIPTION

Figure 2:
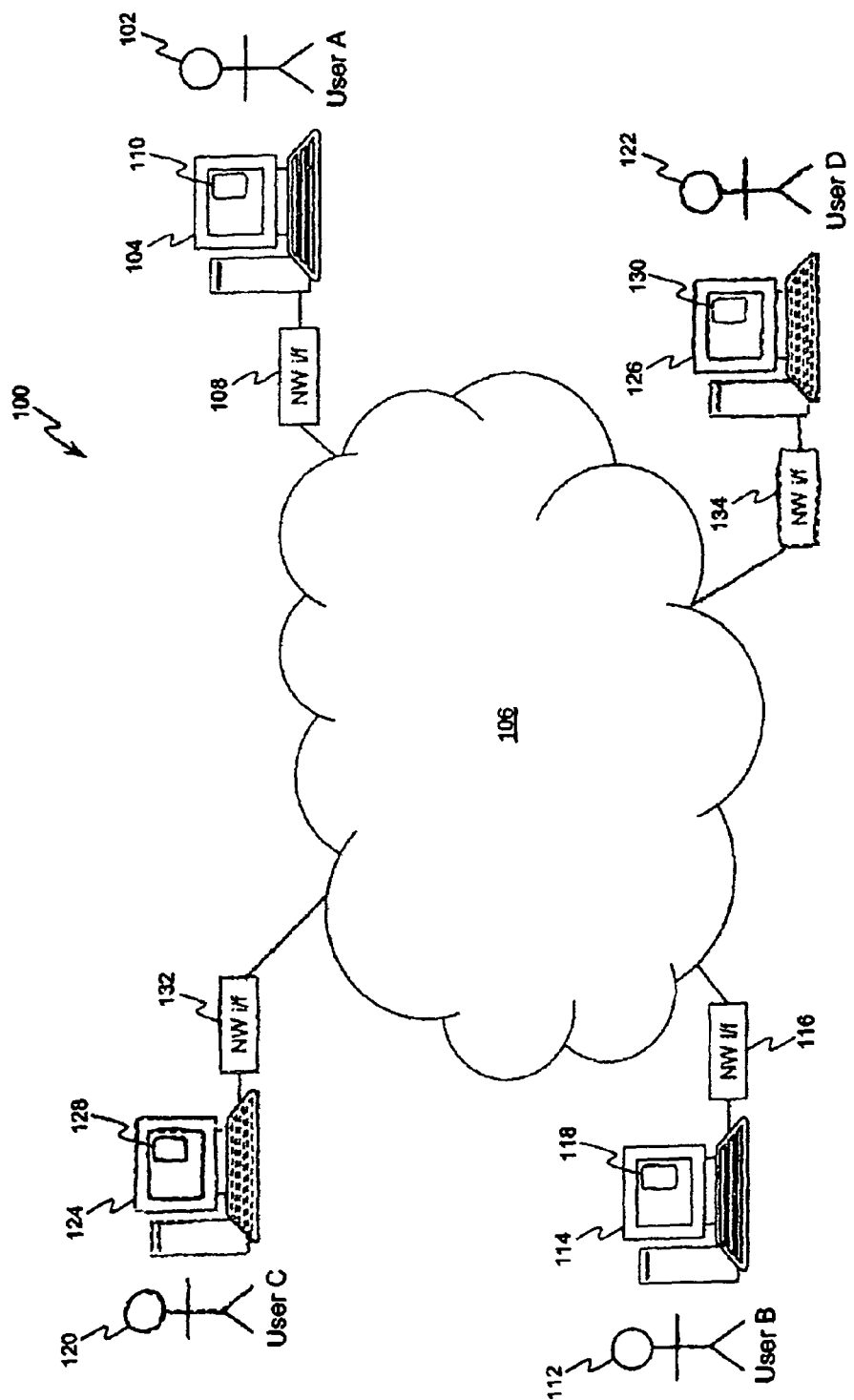
FIG. 2 shows a communication system.

FIG. 2 shows a communication system 100. The communication system may be a VoIP communication system provided by the Internet. In one embodiment of the invention the communication system may be a peer to peer communication system.

A first user, 'User A' 102, of the communication system operates a user terminal 104 connected to a network 106 such as the Internet. The user terminal 104 may be, for example, a personal computer (PC), a personal digital assistant (PDA), a mobile phone, a gaming device or other device able to connect to the network 106. The user terminal 104 has an interface means to receive information from and output information to a user of the device. In a preferred embodiment of the invention the user terminal comprises a display means such as a screen, a keyboard and a mouse. The user terminal 104 is connected to the network 106 via a network interface 108 such as a modem. The connection between the user terminal 104 and the network interface may be via a cable (wired) connection or a wireless connection.

The user terminal 104 executes a communications client 10 provided by the provider of the communication system. The communications client 110 is a software program executed on a local processor in the user terminal 104. The client 110 enables the user of the terminal to access the communication system and to communicate with other users of the communication system 100. The communication client 110 is capable of handling a variety of different types of communication event such as voice calls, video calls, instant messaging (IM) and file transfers. The client 110 will be described in more detail hereinafter.

Also connected to the network 106 are other users of the communication system 100. For example, FIG. 2 illustrates a User B 112 operating a user terminal 114 and connected to the network 106 via a network interface 116. The user terminal 114 executes client software 118 similar to the client 110 executed on the user terminal 104. FIG. 2 also illustrates further users, Users C and D (120 and 122, respectively) operating user terminals (124, 126) executing clients (128, 130), connected to the network 106 via network interfaces (132, 134).

It should be appreciated that in practice there may be a very large number of users connected to the communication system 100. However in FIG. 2 only Users A, B, C and D are shown for clarity.

Figure 3:
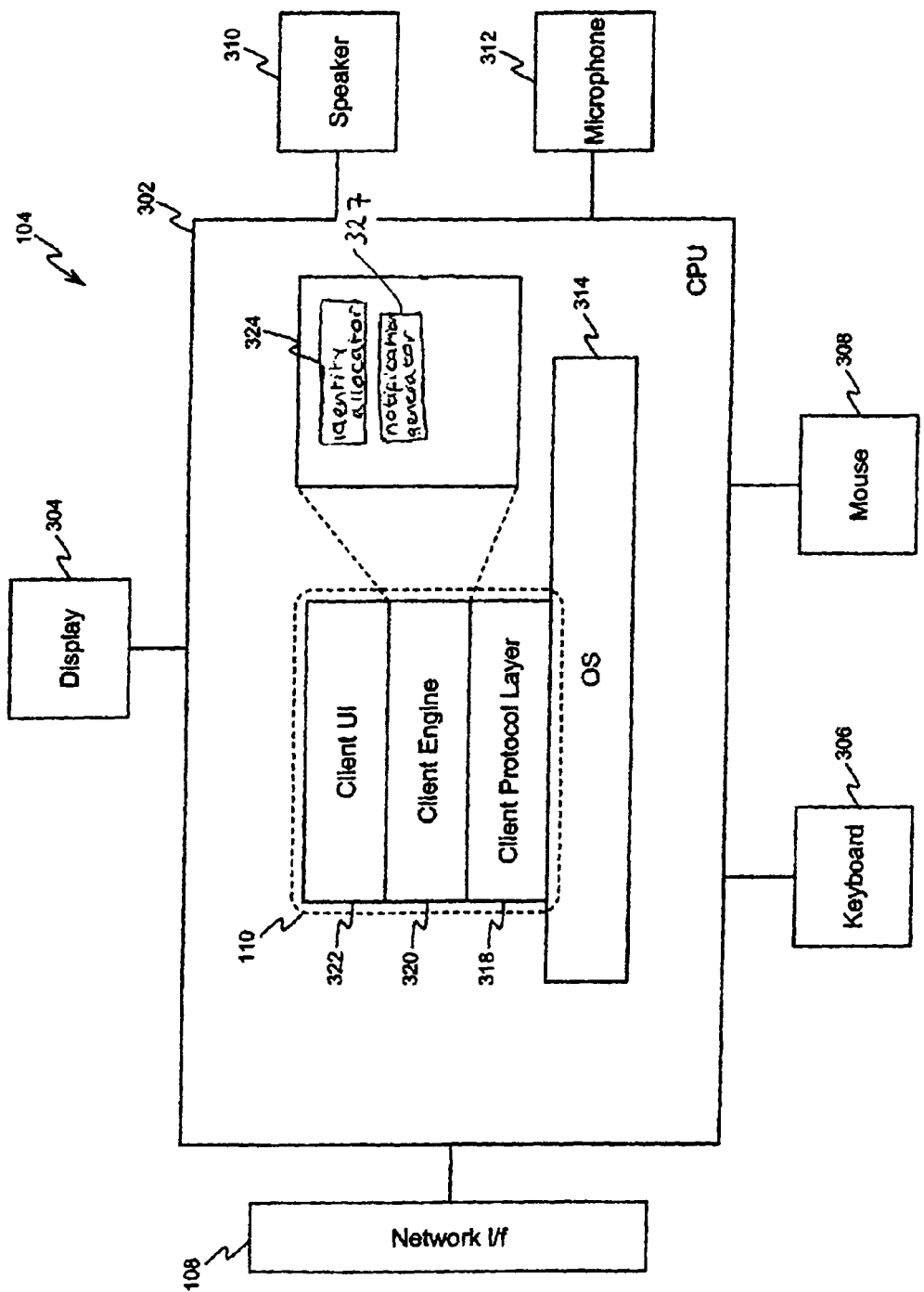
FIG. 3 shows a user terminal executing client software.

FIG. 3 illustrates a detailed view of the user terminal (104) on which the client 110 is executed. The user terminal 104 comprises a central processing unit (CPU) 302, to which is connected a display 304 such as a screen, an input device such as a keyboard 306, a pointing device such as a mouse 308, a speaker 310 and a microphone 312. The speaker 310 and microphone 312 may be integrated into a handset or headset, or may be separate. The CPU 302 is connected to a network interface 108 as shown in FIG. 2.

FIG. 3 also illustrates an operating system (OS) 314 executed on the CPU 302. Running on top of the operating system 314 is a software stack for the client 110. The software stack shows a protocol layer 318, a client engine layer 320 and a client user interface layer (UI) 322. Each layer is responsible for specific functions. Because each layer usually communicates with two other layers, they are regarded as being arranged in a stack as shown in FIG. 3. The operating system 314 manages the hardware resources of the computer and handles data being transmitted to and from the network via the network interface 108. The client protocol layer 318 of the client software communicates with the operating system 314 and manages the connections over the communication system 100. Processes requiring higher level processing are passed to the client engine layer 320. The client engine is responsible for handling the processing required for the user of the user terminal to establish a communication event with other users of the communication system. The client engine 320 also communicates with the client user interface layer 322. The client engine 320 may be arranged to control the client user interface layer 322 to present information to the user via a user interface of the client and to receive information from the user via the user interface.

In accordance with an embodiment of the invention the client engine comprises an identity allocator 324 which is arranged to allocate identities to communication events, and a notification generator 327 which is arranged to generate notifications of actions relating to communication events.

Figure 4A:
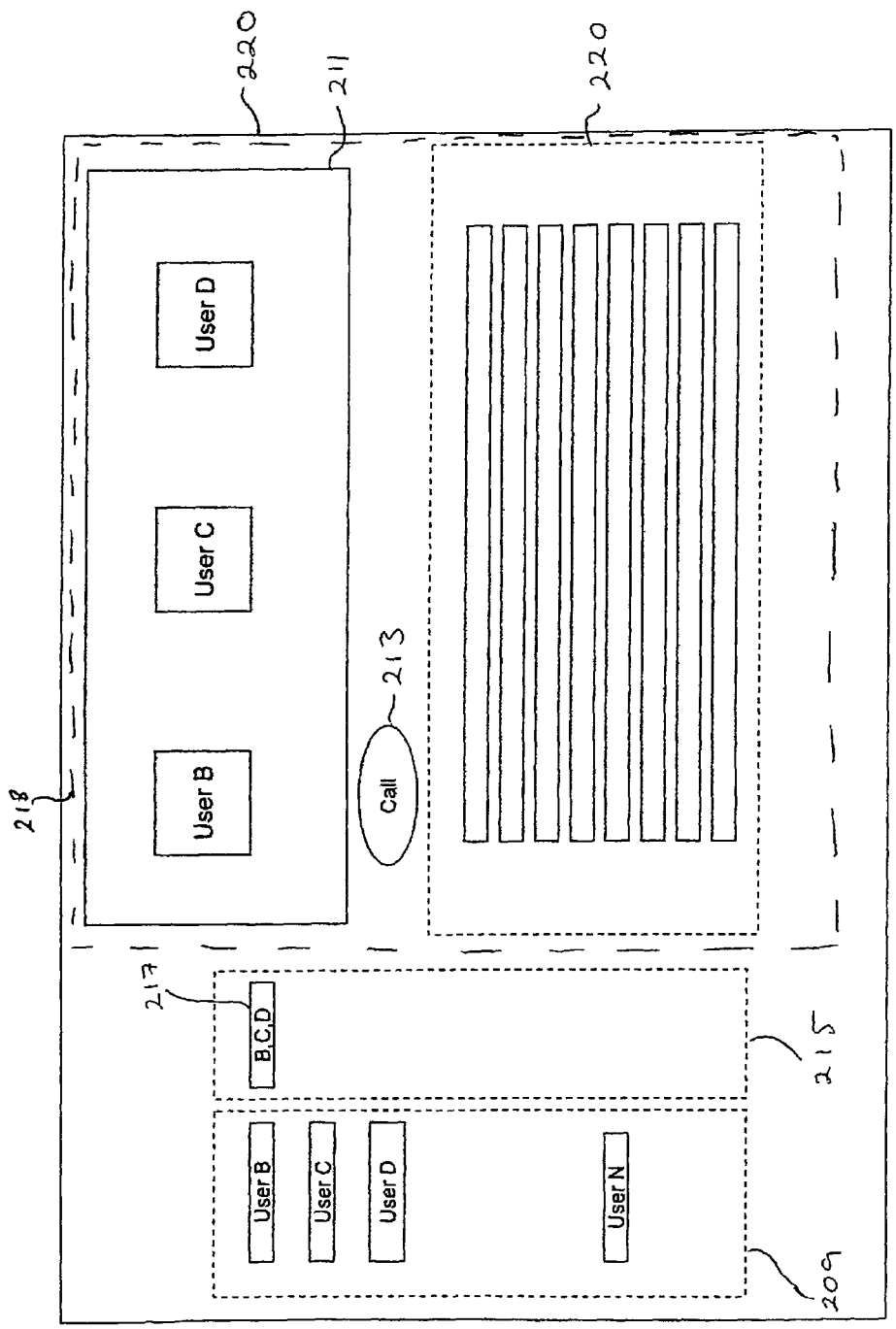
FIG. 4a shows a user interface of a client displayed at User A's terminal.

An example of a user interface 200 of the client 110 executed on the user terminal 104 of the User A 102 is illustrated in FIG. 4a. Objects displayed by the client user interface 200 may be selected using a mouse 308 (FIG. 3), a joystick or a touch screen. A similar client user interface is displayed on the user terminals of User B, User C and User D.

The client user interface 200 comprises a contact list 209, comprising a list of users of the communication system stored as contacts by User A. The contact list 209 is stored in a contact server (not shown in FIG. 2). When the client 110 first logs into the communication system the contact server is contacted, and the contact list is downloaded to the user terminal 104 and displayed in the client user interface 200. This allows the user to log into the communication system from any terminal and still access the same contact list.

Each contact in the contact list has a user-defined presence status icon (not shown) indicating the contact's presence. For example, the presence status icon may be set by the user to indicate that the user is 'online' or 'offline'.

In order to initiate a group call with other users of the communication system, User A may selects one or more contacts to participate in the communication event. The contacts may be selected from the contact list 209.

User A together with the contacts selected by User A to participate in a group call, are hereinafter referred to as members of a 'conversation group'. Communication events initiated by one member of the conversation group to the other members of the group are hereinafter referred to as 'group communication events'.

The client user interface further comprises a conversation list 215, comprising a list of conversation groups. A conversation group icon 217 representing each conversation group in which User A is a member is displayed in the conversation list 215. When a conversation group is selected in the conversation list 217, a conversation area 218 of the client is used for communicating with the selected conversation group When a group call is initiated by a member of the conversation group, the call may, in some cases, only be established with some of the members of the group. Other members of the group may be offline at the time the call is initiated, or may be unavailable to answer the call.

Figure 1:
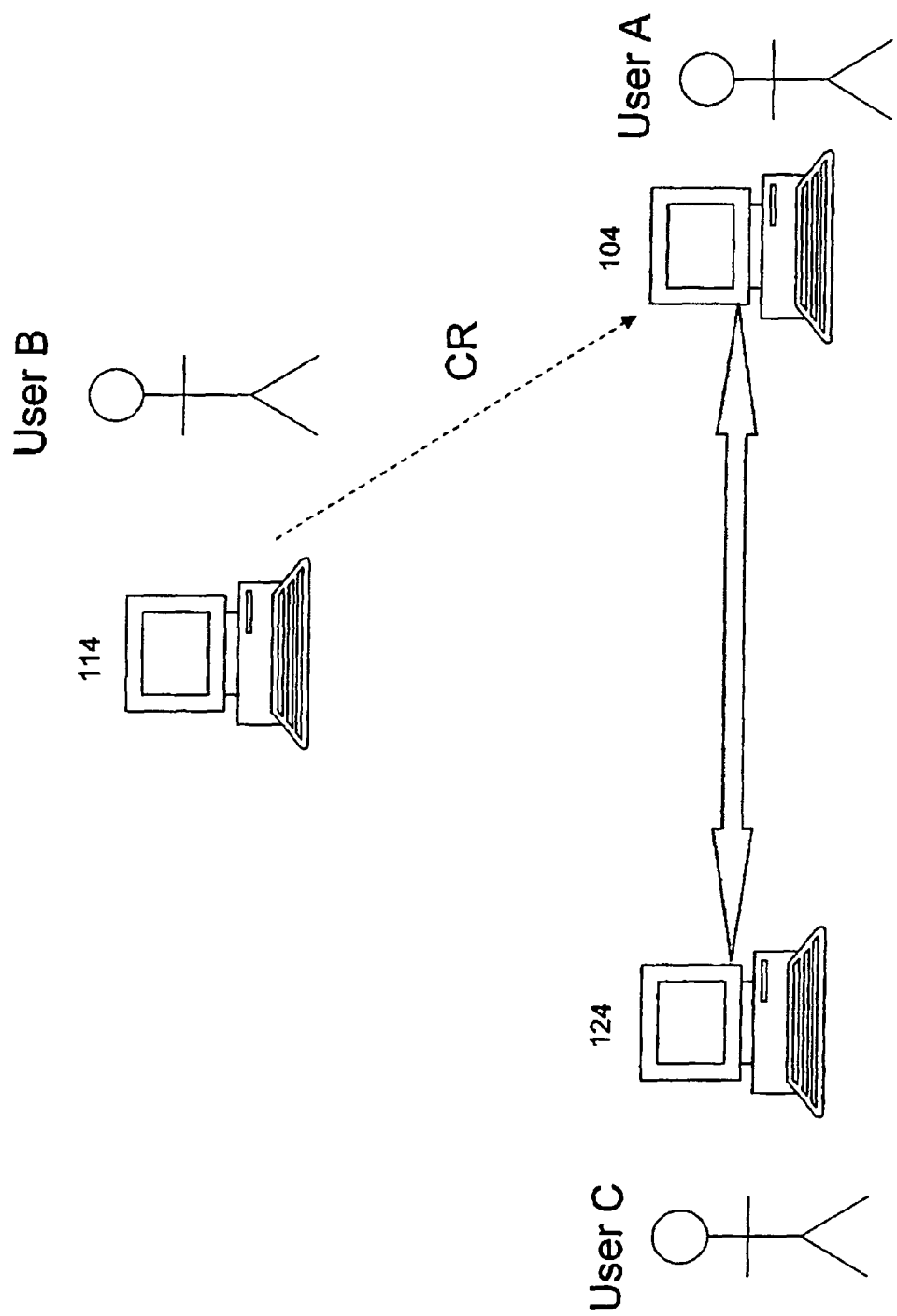
FIG. 1 shows a first user requesting a call set up with a second user engaged on a call with a third user.

As described in relation to FIG. 1, when a user of the communication system attempts to call a user who is engaged on another call the user must authorise the caller for the caller to be added to the call. It is incumbent on the user to determine whether the other participants on the call are willing for the calling party to be added to the call. The user may chose to notify the participants of the call that he wishes to add the calling party before authorising the caller. In this case there may be insufficient time for each user to agree for the caller to be added before the calling party terminates the call attempt. Alternatively the called user may chose to add the calling party before notifying the other participants of the added caller. This is particularly problematic as some participants may not be aware that the called party has been added to the call.

Figure 5:
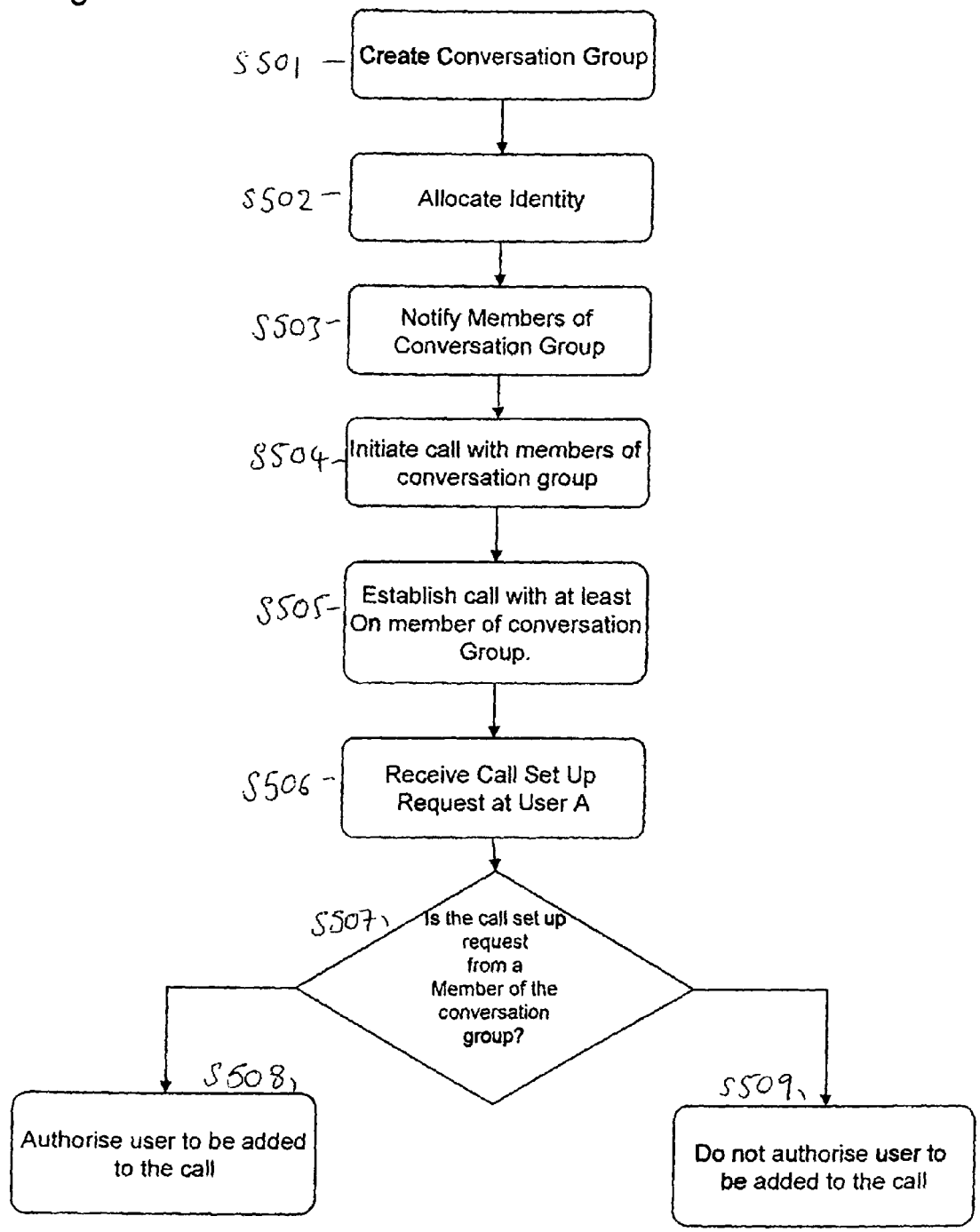
FIG. 5 shows a flowchart illustrating a method of authorising a user to be added to a call.

FIG. 5 illustrates a flowchart for a technique of automating the authorisation of a caller to be added to a call, so that participants of the call are notified of the identity of callers that may be added to the call.

In step S501 User A creates a conversation group. User A may create a conversation group by selecting two or more contacts from the contact list 209 to participate in the group call, or other communication event. User A together with the contacts selected by User A, are hereinafter referred to as members of the 'conversation group'. A conversation group icon 217 representing each conversation group in which User A is a member is displayed in the conversation list 215. The identity of contacts selected as members of the conversation group are displayed in the member area 211. As shown in FIG. 4a the User A has selected User B, User C and User D to be members of the conversation group.

In step S502 the identity allocator of the client 110 executed on User A's terminal is arranged to allocate an identity to the conversation group.

In step S503 a group notification message is generated by the notification generator 327 of the client 110 executed on User A's terminal in response to User A creating a conversation group. The group creation notification message is transmitted to members of the group using an IM (instant messaging) protocol.

Figure 6:
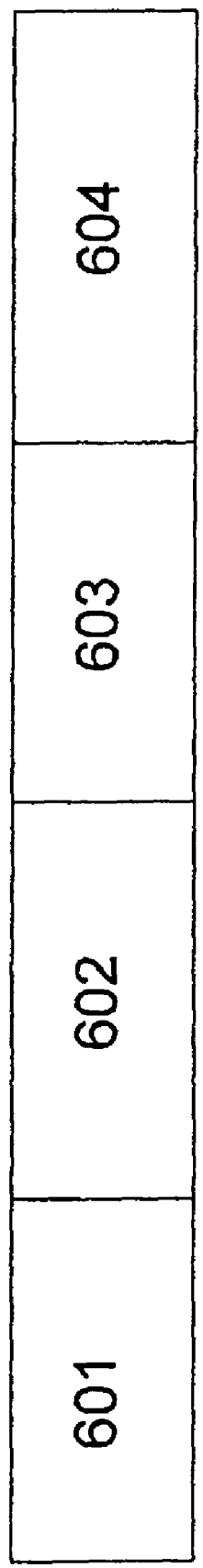
FIG. 6 shows the structure of a notification message.

FIG. 6 shows the structure of a notification message 600. A notification message comprises a header 601, a conversation group identity field 602, an action field 603, and a username field 604.

The header 601 of the notification message 600 is used to address the notification message to each member of the conversation group.

The conversation group identity field 602 is used to identify the conversation group to which the notification message relates. The conversation group identity field 602 comprises the identity allocated by the identity allocator 324 in step S502.

The action field 603 of a notification message is used to identify the action to which the notification message relates. In a group creation notification message the action field identifies that the notification message relates to the creation of a group.

The username field 604 of the group creation notification message contains a list of the usernames of the members of the group.

In step 504 a group call is initiated by User A with the members of the conversation group. User A may initiate a group call by selecting the call button 213 located in the conversation area 218 of the client interface. In response to the user selecting the call button 213 in the client user interface 200, the client engine 320 is arranged to provide instructions to the protocol layer 318 to transmit a call set up request to members of the conversation group using a calling protocol.

In a preferred embodiment of the invention the client executed on User A's terminal is arranged to include the identity allocated to the conversation group by the identity allocator, in the call set up message. As such, each recipient of the call set up message may identify that the call set up message is associated with the communication group. In one embodiment, when a recipient of the call set up message answers the call, the members of the conversation group associated with the call are displayed in the member area 211 of the recipient's client user interface.

In step S505 the call is established between User A and at least one member of the conversation group. If the call is answered by more than one member of the conversation group User A establishes a group call where User A's terminal is the host of the group call.

In step S506 User A receives a call set up request from a user of the communication system. A call set up request may be received from a member of the conversation group, who did not establish a call in response to the receiving the call set up request. Alternatively the call set up request may be received from a user of the communication system who is not a member of the conversation group.

In step S507 it the client is arranged to determine if the user is a member of the conversation group.

In step S508, if it is determined that the user is a member of the conversation group, the client is arranged to add the caller to the group call.

In step S509, if it is determined that the user is not a member of the conversation group, the caller is not authorised and the caller is not added to the group call.

The method illustrated in FIG. 5 therefore provides a technique for sharing the identities of members of a conversation group who are authorised to be added to a group call. This obviates the need for a user to authorise call requests from members of the conversation group during a group call.

In accordance with a preferred embodiment of the invention, a call set up request transmitted from a member of the conversation group to another member of the conversation group may indicate that the caller intends to join a group call previously initiated by the other user. In this case the caller will only be added to a group call if the call set up message indicates that the user wishes to join the group call.

A method for joining a group call will now be explained with reference to FIG. 7. In this case User B is attempting to join a group call initiated by User A.

Figure 4B:
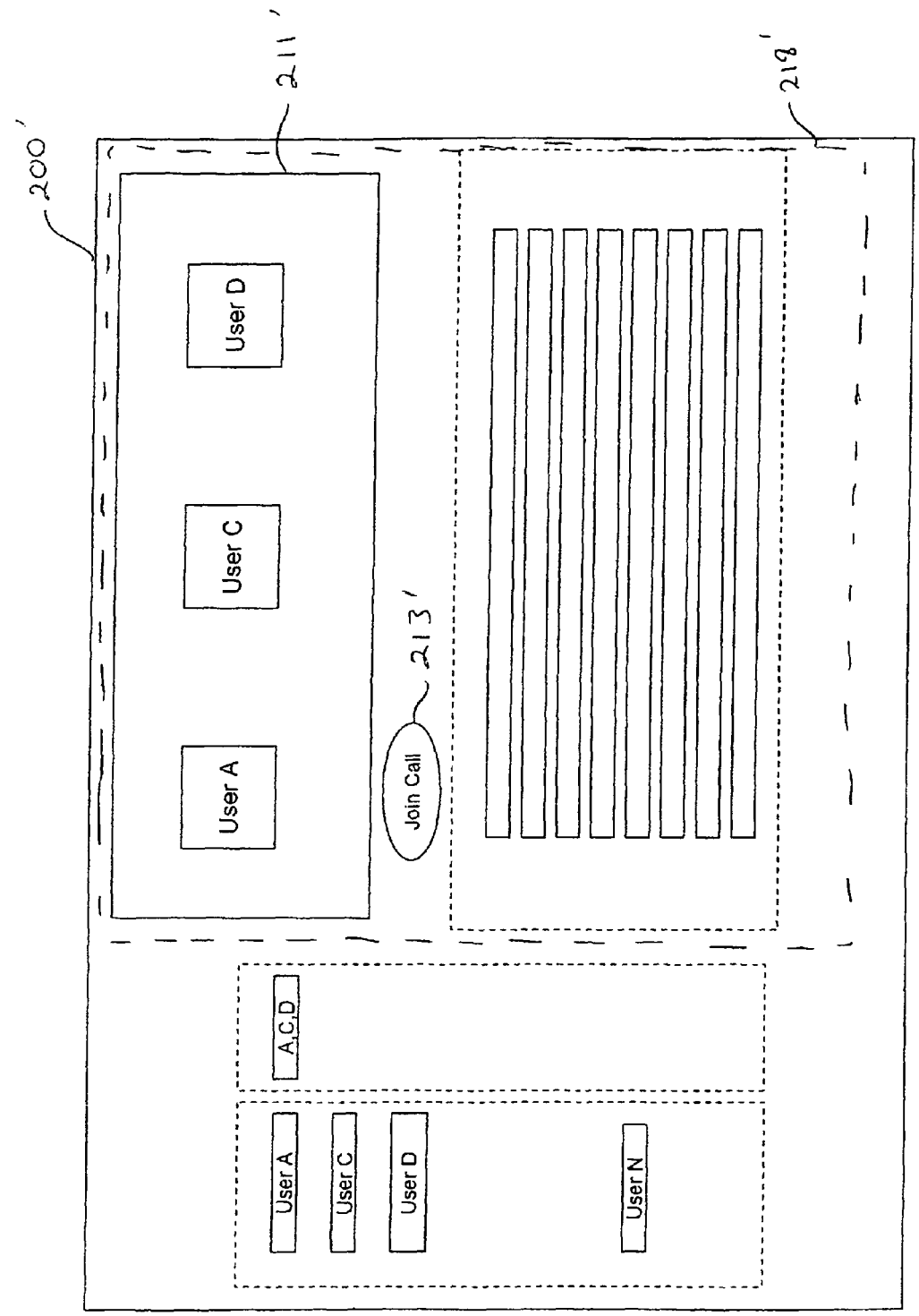
FIG. 4b shows a user interface of a client displayed at User B's terminal.

In step S701 the client 118 executed at User B's terminal receives a group creation notification message transmitted from User A's terminal. The client 118 determines the conversation group identity, the identity of each member of the group and the action to which the notification message relates. In one embodiment of the invention the client is arranged to display the identity of each member of the conversation group in the member area 211' of client user interface displayed on the User B's user terminal. FIG. 4b shows the client user interface displayed at User B's terminal. The member area 211' identifies User A, User C and User D as other members of the conversation group.

In step S702 the client receives a group call set up request transmitted from User A using a calling protocol. The group call set up request includes the identity of the conversation group.

In step S703, in response to missing, or rejecting the call initiated by User A the client executed on User B's terminal provides User B with the option of joining the group call. This may be provided by a join call button 213' as shown in FIG. 4b.

In step S704 the client determines if the join call option has been selected. If the join call option is selected the method proceeds to step S707.

In step S707 the client executed at User B's terminal is arranged to transmit a call set up request message to User A's terminal using the calling protocol. In accordance with an embodiment of the invention the call set up request transmitted to join the group call includes the conversation group identity.

In step S708 the client 110 executed on User A's terminal receives the call set up request transmitted from User B's terminal. The client 110 is arranged to analyse the call set up request to determine if the call set up request is a request to join an ongoing call. If the client identifies that a conversation group identity is present in the call set up request the client determines that the call set up request is a request to join a group call initiated with the identified conversation group. If a conversation group is not identified in the call set up request the client determines that the call set up request is a request to set up a call between User A and User B only.

In step S709 if it is determined that the call set up request is a request to join a group call initiated with the identified conversation group, the client 110 determines if a group call initiated with the conversation group is in progress with at least one member of the conversation group. If the group call is in progress with at least one member of the conversation group User caller B is added to the call.

In step S710 if it is determined that the call set up request is a request to set up a call between User A and User B only, if the client is not engaged on another call the client 110 is arranged to accept the call request. Conversely, if the client is engaged on another call the client is arranged to reject the call request transmitted from User B.

In a further embodiment of the present invention a further notification message is sent from User A to other members of the conversation group identifying when the group call has terminated. The action field of the notification message will indicate that the call is terminated. The conversation group identity included in the notification message will indicate the group call to which the notification relates.

Figure 7:
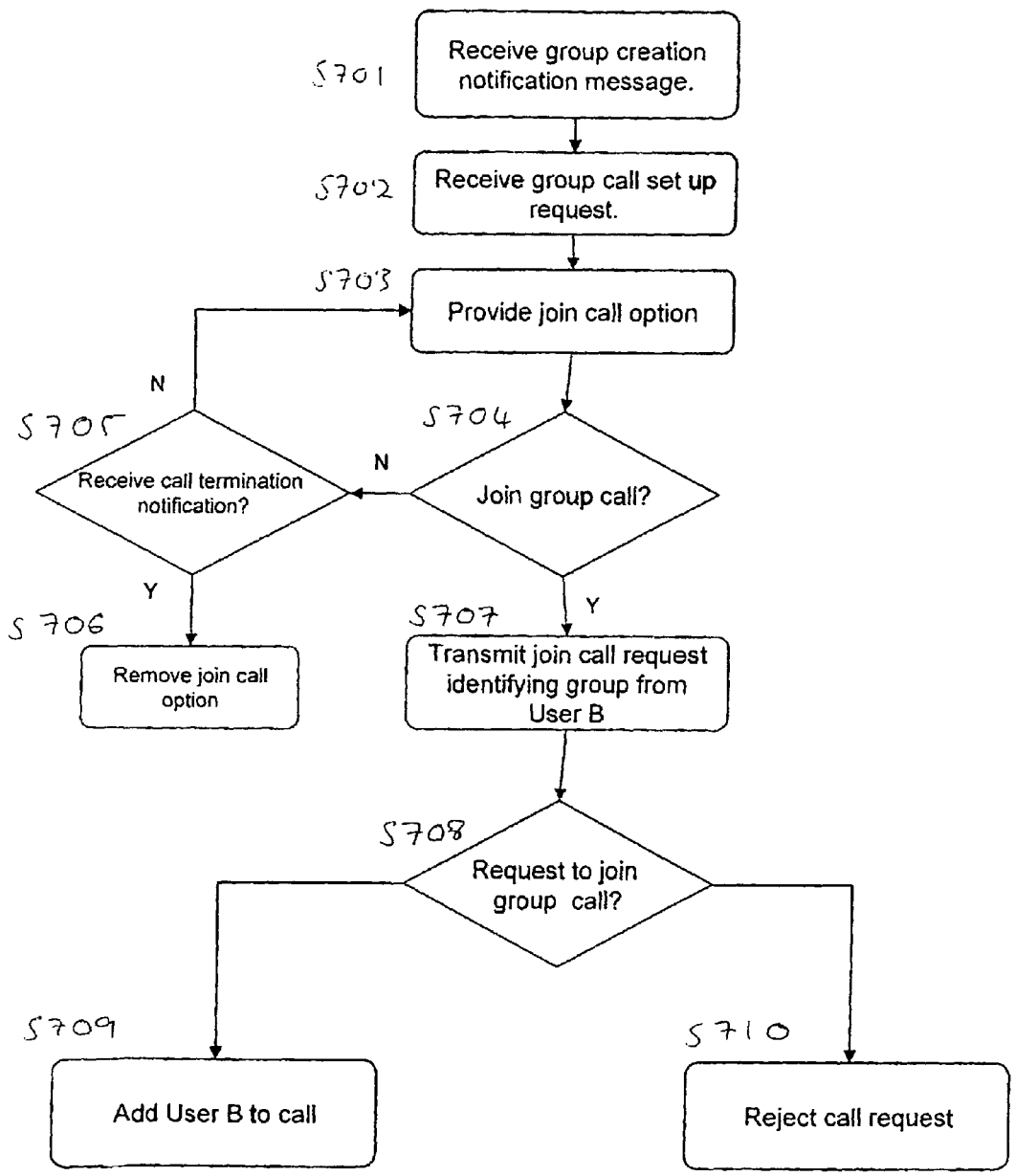
FIG. 7 shows a flow chart illustrating a method for joining a group call.

In this case, referring again to the example shown in FIG. 7, if it is determined in step S704 that User B has not selected the option to join the group call, then in step S705 the client executed on User B's terminal determines if a call termination notification has been received from User A.

In step S706, if it is determined that a call termination notification identifying the group call has been received from User A, the join call option 213' is removed from the client user interface 200' displayed on User B's terminal.

If it is determined that a call termination notification identifying the group call has not been received from the User A, the method returns to step S703 and the join call option 213' is displayed.

In an alternative embodiment of the invention the client executed on User A's terminal is arranged to generate a 'call established' notification message in response detecting that a call connection has been established with at least one user. The call established notification message is transmitted to the members of the conversation group. In this embodiment of the invention, in step S703 of the method described in relation to FIG. 7 the client executed on User B's terminal provides User B with the option of joining the group call in response to receiving the call established notification message.

While this invention has been particularly shown and described with reference to preferred embodiments, it will be understood to those skilled in the art that various changes in form and detail may be made without departing from the scope of the invention as defined in the claims.

What is claimed is:

1. A method of authorising a user of a communication system to be added to a group communication event comprising:
   selecting, at a host node on a first user terminal, a group of users of the communication system, the first user terminal being associated with a user who is a member of the group of users;
   initiating, from the host node, the group communication event with the group of users;
   responsive to receiving a group communication acceptance from at least a first user in the group, establishing, using the host node, the group communication event with the first user in the group;
   using the host node, enabling display of, in a user interface of a client configured to execute at a user terminal associated with the at least first user of said group of users, the identity of each member of the group communication event in response to receiving a notification of the group communication event;
   receiving, at the host node and from another user of the communication system during the group communication event, a communication set up request associated with a communication event;
   analysing the communication set up request effective to determine if said another user is a member of said group of users associated with said group communication event initiated by the host node;
   responsive to determining said another user is a member of said group of users associated with said group communication event, determining whether the communication set up request indicates said another user requests to join said group communication event;
   responsive to determining that said another user is a member of said group of users and requests to join said group communication event, adding said another user to the group communication event, and displaying the identity of said another user in said user interface;
   responsive to determining that said another user is a member of said group of users associated with said group communication event and said another user does not request to join said group communication, rejecting the communication set up request from said another user; and
   responsive to determining that said another user is not a member of said group of users associated with said group communication event, rejecting the communication set up request from said another user.

2. The method as claimed in claim 1 further comprising the steps of:
   assigning an identity to said group communication event; and
   transmitting a notification of the communication event to said group of users, wherein the notification comprises the identity assigned to the communication event.

3. The method as claimed in claim 2 wherein the notification of the group communication event comprises a group communication event set up request.

4. The method as claimed in claim 3 wherein the group communication set up request is transmitted using a calling protocol.

5. The method as claimed in claim 2 wherein the notification of the group communication event comprises a communication event notification message.

6. The method as claimed in claim 1 further comprising:
transmitting a group creation notification message from the host node to the group of users, wherein the group creation notification message comprises a list comprising the identity of each member of the group of users and an identity assigned to the group.

7. The method as claimed in claim 6 wherein the identity assigned to the communication event is the identity assigned to the group.

8. The method as claimed in claim 6 wherein the communication event notification message and the group creation notification message are transmitted using an instant messaging protocol.

9. The method as claimed in claim 1, wherein the communication set up request is transmitted using a calling protocol.

10. A communication system comprising:
a host node, the host node being a user terminal out of a plurality of user terminals operated by a plurality of users of the communication system, wherein the host node further comprises:
  means for selecting a group of users from the plurality of users of the communication system, wherein the host node is associated with a user of the group of users;
  means for initiating a group communication event with the group of users;
  means for establishing a group communication event with at least a first user in the group, responsive to receiving a group communication acceptance from the at least first user in the group;
  means for receiving a communication set up request from another user of the communication system during the group communication event;
  means for analysing the communication set up request effective to determine if said another user is a member of said group of users;
  means for determining if said communication set up request from said another user is associated with said group communication event initiated by the host node;
  means for determining, responsive to determining said another user is a member of said group of users whether the communication setup request indicates said another user requests to join said group communication event;
  means for, responsive to determining said another user is a member of said group of users and requests to join said group communication event, adding said another user to the group communication event;
  means for, responsive to determining said another user is a member of said group of users associated with said group communication event and said another user does not request to join said group communication event, rejecting the communication setup request from said another user; and
  means for, responsive to determining said another user is not a member of said group of users associated with said group communication event, rejecting the communication set up request from said another user.

11. The communication system as claimed in claim 10, wherein the host node further comprises
  means for assigning an identity to said group communication event; and
  means for transmitting a notification of the communication event to said group of users, wherein the notification comprises the identity assigned to the communication event.

12. The communication system as recited in claim 11, wherein the notification message to each user in the group of users further comprises:
  a conversation group identification (ID) field configured to include the identity assigned to the communication event;
  an action field configured to identify an action associated with the group communication event; and
  a username field configured to include a list of identities of each member in said group of users.

13. The communication system as recited in claim 12, wherein the means for analyzing the communication set up request further comprises means for analyzing the communication set up request to identify whether the set up request includes the conversation group ID sent in the notification message.

14. The communication system as recited in claim 11, the communication system further comprising means for downloading contact information associated with the plurality of users from a computing device that is different from the host node.

15. The communication system as recited in claim 14, the contact information comprising presence information associated with each user of the plurality of users.

16. A computer program product embodied on computer-readable storage medium hardware comprising program code which when executed by a computer processor directs the computer processor to:
  select a group of users of the communication system;
  initiate from a host node the group communication event with the group of users, the host node being a user terminal operated by a user who is a member of the group of users;
  responsive to receiving a group communication acceptance from at least a first user in the group, establish the group communication event with the first user in the group;
  enable display of, in a user interface of a client configured to execute at a user terminal of the at least first user of said group of users, the identity of each member of the group communication event in response to receiving a notification of the group communication event;
  receive at the host node from another user of the communication system during the group communication event, a communication set up request for setting up a communication event;
  analyse the communication set up request effective to determine if said another user is a member of said group of users associated with said group communication event initiated by the host node;
  responsive to determining said another user is a member of said group of users associated with said group communication event, determine whether the communication set up request indicates said another user requests to join said group communication event;
  responsive to determining that said another user is a member of said group of users and requests to join said group communication event, add said another user to the group communication event, and display the identity of said another user in said user interface;
  responsive to determining that said another user is a member of said group of users associated with said group communication event and said another user does not request to join said group communication event, reject the communication set up request from said another user; and
  responsive to determining that said another user is not a member of said group of users associated with said group communication event, reject the communication setup request from said another user.

17. The computer program product as recited in claim 16, the program code further configured to direct the computer processor to:
  display, at the host node, a contact list associated with plurality of users of the communication system, the display configured to enable selection of each user of the plurality of users;
  display, at the host node, a conversation list comprising at least one conversation group associated with the host node, the host node further configured to display multiple conversation groups; and
  enable, at the host node, selection of a conversation group in the conversation list; and
  responsive to selection of a conversation group in the conversation list, display, at the host node, information associated with each user of with said selected conversation group in the conversation list.

18. The computer program product as recited in claim 17, the program code further configured to direct the computer processor to display a presence status icon for each user associated with the contact list.

19. The computer program product as recited in claim 16, the program code further configured to direct the computer processor to initiate the group communication event with the group of users responsive to receiving input via a selectable button displayed on a user interface associated with the host node.

20. The computer program product as recited in claim 16, the program code further configured to direct the computer processor to send a notification message to each user of a group communication event effective to terminate the group communication event.

* * * * *